US008813249B2

(12) United States Patent
Gu (10) Patent No.: US 8,813,249 B2
(45) Date of Patent: Aug. 19, 2014

(54) MAPPING IDENTITIES TO DOCUMENTS TO ENABLE MULTIPLE USER LOGINS

(75) Inventor: Shelley Gu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 20 days.

(21) Appl. No.: 13/287,962

(22) Filed: Nov. 2, 2011

(65) Prior Publication Data

US 2013/0111606 A1    May 2, 2013

(51) Int. Cl.
*G06F 21/00* (2013.01)
*G06F 21/62* (2013.01)

(52) U.S. Cl.
CPC ................................. *G06F 21/6218* (2013.01)
USPC .......................................................... 726/28

(58) Field of Classification Search
CPC .................................................. G06F 21/6218
USPC .......................................................... 726/28
See application file for complete search history.

(56) References Cited

U.S. PATENT DOCUMENTS

| | | | |
|---|---|---|---|
| 6,377,971 B1 | 4/2002 | Madden et al. | |
| 6,810,429 B1 | 10/2004 | Walsh et al. | |
| 7,962,853 B2 | 6/2011 | Bedi et al. | |
| 2003/0079126 A1* | 4/2003 | Kadam et al. ................. | 713/168 |
| 2006/0074913 A1 | 4/2006 | O'Sullivan et al. | |
| 2007/0156744 A1 | 7/2007 | Harrington | |
| 2007/0226790 A1* | 9/2007 | Maher et al. .................... | 726/18 |
| 2007/0239998 A1* | 10/2007 | Beck .............................. | 713/193 |
| 2008/0104393 A1* | 5/2008 | Glasser et al. ................. | 713/165 |
| 2008/0162403 A1 | 7/2008 | Sundaresan | |
| 2009/0006948 A1 | 1/2009 | Parker et al. | |
| 2009/0125972 A1 | 5/2009 | Hinton et al. | |
| 2010/0158254 A1 | 6/2010 | Schaad et al. | |
| 2011/0047590 A1* | 2/2011 | Carr et al. ......................... | 726/1 |
| 2012/0063593 A1* | 3/2012 | Camenisch et al. ............ | 380/44 |

FOREIGN PATENT DOCUMENTS

| | | |
|---|---|---|
| JP | 2010-266691 | 11/2010 |
| KR | 10-2005-0021798 | 3/2005 |
| KR | 10-2007-0018569 | 2/2007 |

OTHER PUBLICATIONS

Timon, et al., "Document Access Control in Organizational Workflows", In International Journal of Information and Computer Security, vol. 1, Issue 4, Oct. 2007, pp. 437-454.
PCT Application PCT/US2012/062888, Written Opinion and International Search Report mailed May 29, 2013, 9 pages.

* cited by examiner

*Primary Examiner* — Peter Shaw
(74) *Attorney, Agent, or Firm* — Steve Crocker; Jim Ross; Micky Minhas (57) ABSTRACT

Embodiments of the present disclosure provide a system and method for enabling multiple users to access, edit and save content items using a shared computing device. The method and system described herein utilizes an identification table to identify previous associations between each user and each content item. If it is determined that a previous association exists between a particular user and the content item, the particular user may interact with the content item. If however, it is determined that a previous association does not exist, the particular user may attempt to utilize another user's credentials to interact with the content item.

19 Claims, 7 Drawing Sheets

MAPPING IDENTITIES TO DOCUMENTS TO ENABLE MULTIPLE USER LOGINS

BACKGROUND

With advances in technology, sharing documents and other data between various entities and individuals is becoming more and more popular. However, it is becoming increasingly difficult to manage which entities or individuals may, and should, have access to each document or data being shared.

It is with respect to these and other general considerations that embodiments of the present disclosure have been made. Also, although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide a system and method for enabling multiple users to access, edit and save content items using a shared computing device. The method and system described herein utilize an identification table to identify previous associations between each user and each content item. If it is determined that a previous association exists between a particular user and the content item, the particular user may interact with the content item. If however, it is determined that a previous association does not exist, the particular user may attempt to utilize another user's credentials in order to interact with the content item or a new association between the content item and the particular user may be created.

More specifically, a system and method for accessing a content item using a shared computing device is disclosed. In an embodiment, a request is received to interact with a content item in a requested manner (e.g., opening the content item). When the request is received, a determination is made as to whether an association exists between at least one user of a plurality of users of the computing device and the content item. In certain embodiments, the determination is made, at least in part, on information stored in a document identification table. When it is determined that an association exists, a determination is made as to whether a current user of the computing device is the same user as the user identified in the identification table. If the current user is same as the identified user, the current user may interact with the content item in the requested manner. Alternatively, if the current user is not equivalent to the at least one user, an attempt is made to enable interaction between the current user and the content item in the requested manner using credentials that are associated with the current user. Additionally, when the attempt to enable interaction between the current user and the content item is unsuccessful, an attempt is made to enable interaction between the current user and the content item using credentials associated with the identified user.

Embodiments may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
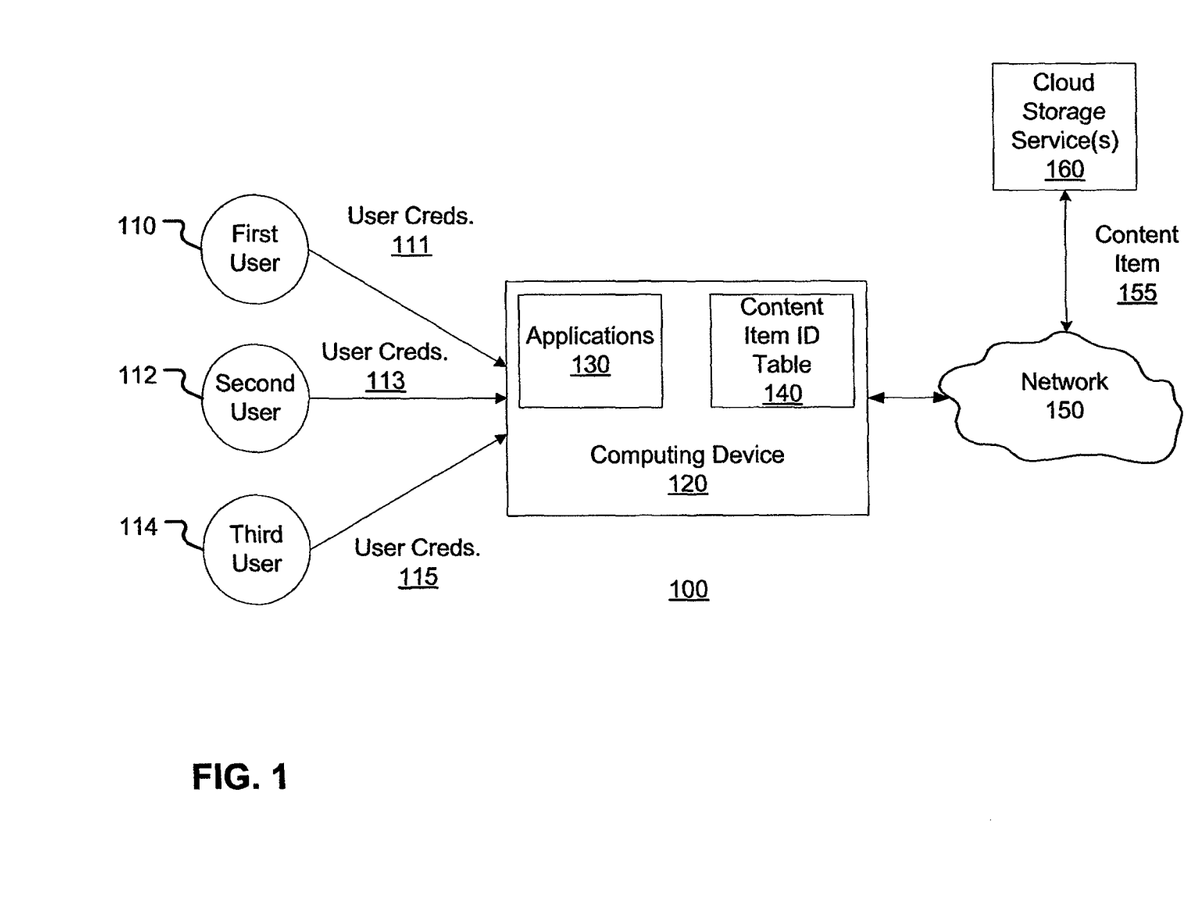
FIG. 1 illustrates a system for accessing a content item using a shared computing device according to one or more embodiments.

FIG. 1 illustrates a system 100 for sharing a content item 155 between multiple users (e.g., first user 110, second user 112, and third user 114) of a computing device 120. Although three different users are shown in FIG. 1, it is contemplated that there may be fewer users or additional users that share a single computing device 120. More specifically, the system 100 may be used to (i) determine an owner of a content item 155, (ii) determine if one or more users have necessary credentials to interact with the content item 155, and (iii) store and update associations between the one or more users and the content item 155. Although in embodiments disclosed, the computing device 120 is a multi-tenant device, it is also contemplated that the systems and methods described herein may be applicable to single-tenant devices.

As shown in FIG. 1, the system 100 includes a computing device 120. The computing device 120 may be a desktop or laptop computer, a tablet computer, a mobile phone, a personal digital assistant and the like. Among other components, the computing device 120 includes an operating system that executes one or more applications 130. The applications 130 may be word processing applications, spreadsheet applications, database applications, email applications, and the like. Each application 130 may be used to create a content item 155. When a user initiates creation of a content item (e.g., through use of the applications 130), an association between the user and the content item 155 is stored in a content item ID table 140. As will be explained in detail below, the content item ID table stores an association between (i) the location where the content item is stored (e.g., a Uniform Resource Locator (URL) associated with a cloud storage service 160 or an entity using a particular cloud storage service) and (ii) an identifier associated with the owner of the content item (e.g., the user who initially created or edited the content item).

In certain embodiments, the computing device 120 may require one or more users to submit user credentials in order to log in to (i) the operating system of the computing device 120, or (ii) one or more applications 130 being executed by the computing device 120. The user credentials may be specific to each user that attempts to log in to each of the computing device 120 or the applications 130. For example, first user 110 may have a set of user credentials 111, second user 112 may have a set of user credentials 113, and third user 114 may have a set of user credentials 115. In an embodiment, each user's user credentials include a user name and password or other input that is associated with and identifies the each of the users. For example, each user's user credentials may include one or more of a WINDOWS LIVE ID, an OFFICE 365 ID, an email address and associated password, a username and password, an organization ID, email address associated with an organization, an operating system log on ID, etc. In an embodiment, each of the users may use single sign-on credentials which enable each of the users to access (i) the operating system, and (ii) the one or more applications 130 by entering their user credentials at a single point in time. Alternatively, each user may be required to input different user credentials for (i) the operating system, and (ii) the one or more applications 130.

The computing device 120 may also have access to a network connection 150 or other communication means whereby the computing device 120 can access one or more cloud storage service(s) 160. The cloud storage service 160 enables a user to access, save, or change content associated with a content item 155. In certain embodiments, the content item 155 may be stored locally on the computing device 120. In another embodiment, the content item is stored on one or more cloud storage services 160.

As will be explained in detail below, the content item 155 may be shared among the multiple users of the computing device 120. In certain embodiments, access to the content item 155 may be based on credentials (e.g., permissions) associated with each user. Examples of cloud storage services 160 include, but are not limited to, SKYDRIVE, SHAREPOINT by Microsoft Corporation of Redmond, Wash., DROPBOX by Officeware Corporation, and the like. Although specific examples have been given, it is contemplated that other external storage services may be used with embodiments disclosed herein.

In an embodiment, a user (e.g., first user 110), may have access to multiple cloud storage services 160. In such instances, first user 110 may have a first set of credentials associated with a first cloud storage service and a second set of credentials associated with a second cloud storage service. In another embodiment, the credentials of the first user 110 may be used to access both the first cloud storage service and the second cloud storage service. In yet another embodiment, the credentials that first user 110 used to access the one or more cloud storage services 160 may be the same credentials the first user 110 used to access the operating system of the computing device 120 and/or the applications 130.

As with first user 110, second user 112 may also have access to one or more cloud storage services 160. In certain embodiments, second user 112 may be required to provide user credentials 113 to one or more of (i) the operating system of the computing device 120, (ii) the applications 130 and (iii) one or more of the cloud storage services 160. Although the first user 110 and the second user 112 share the computing device 120, it is contemplated that each user may have access to different cloud storage services 160. Additionally, it is contemplated that each of the users may have access to the same cloud storage service 160 (e.g., SKYDRIVE) or even the same account for a particular cloud storage service 160.

As discussed above, the computing device 120 may be a multi-tenant device. As such, embodiments disclosed herein enable each user of the computing device 120 to be simultaneously logged in to (i) the operating system of the computing device 120 and (ii) one or more applications 130 of the computing device. Thus, when switching between users of the computing device 120, a previous user does not need to log out prior to the current user logging in. Although multiple users may be simultaneously logged in to (i) the operating system, (ii) one or more applications 130, or (iii) the cloud storage services 160, a determination is made as to each user's access permissions before enabling a particular user each user to access a selected content item. As each content item 155 is interacted with, the interactions between each user and the content item is tracked so that information associated with the content item is correctly updated.

For example, if the first user 110 created a word processing document and saved the document on a particular cloud storage service 160, the system and method described herein help ensure that when the document is subsequently opened by the first user 110, the appropriate user credentials 111 are used to open the document. Additionally, the system and method described herein also help ensure that if another user, such as, for example, second user 112 attempts to open the document, (i) the second user 112 can only open the document if he has permission to open the document, (ii) changes made to the document by the second user 112 are correctly attributed to the second user 112, and (iii) the document is saved back to the correct location of the cloud storage service 160 (e.g., the location to which the first user originally saved the document).

Figure 2A:
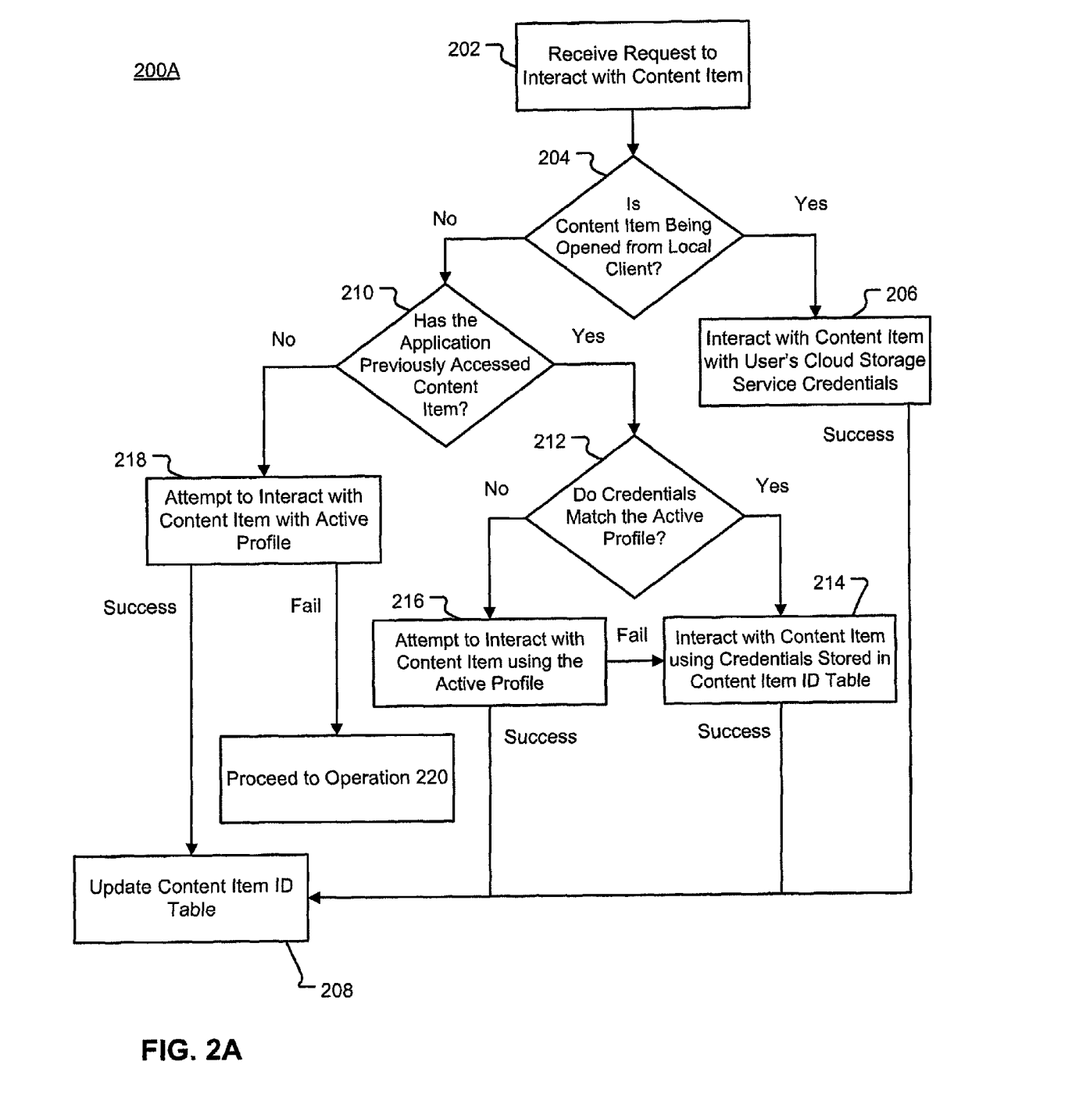
FIGS. 2A, 2B, and 2C illustrate a method for sharing a content item between multiple users of a computing device according to one or more embodiments.
Figure 2B:
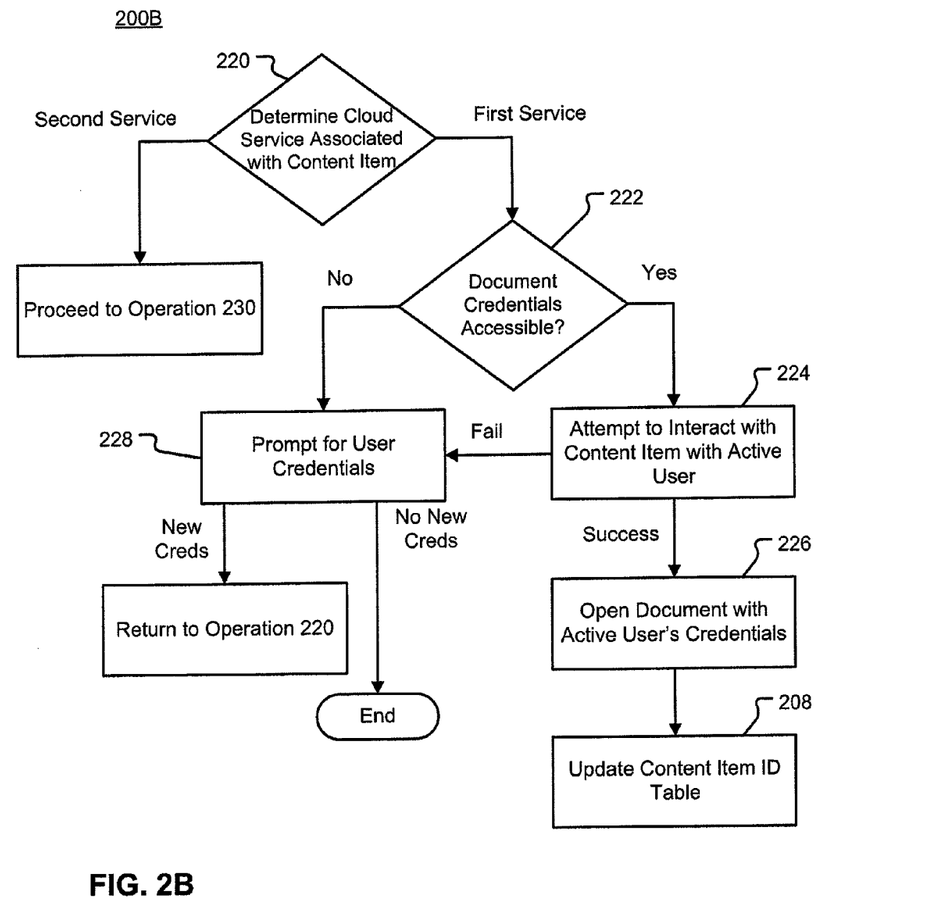
Figure 2C:
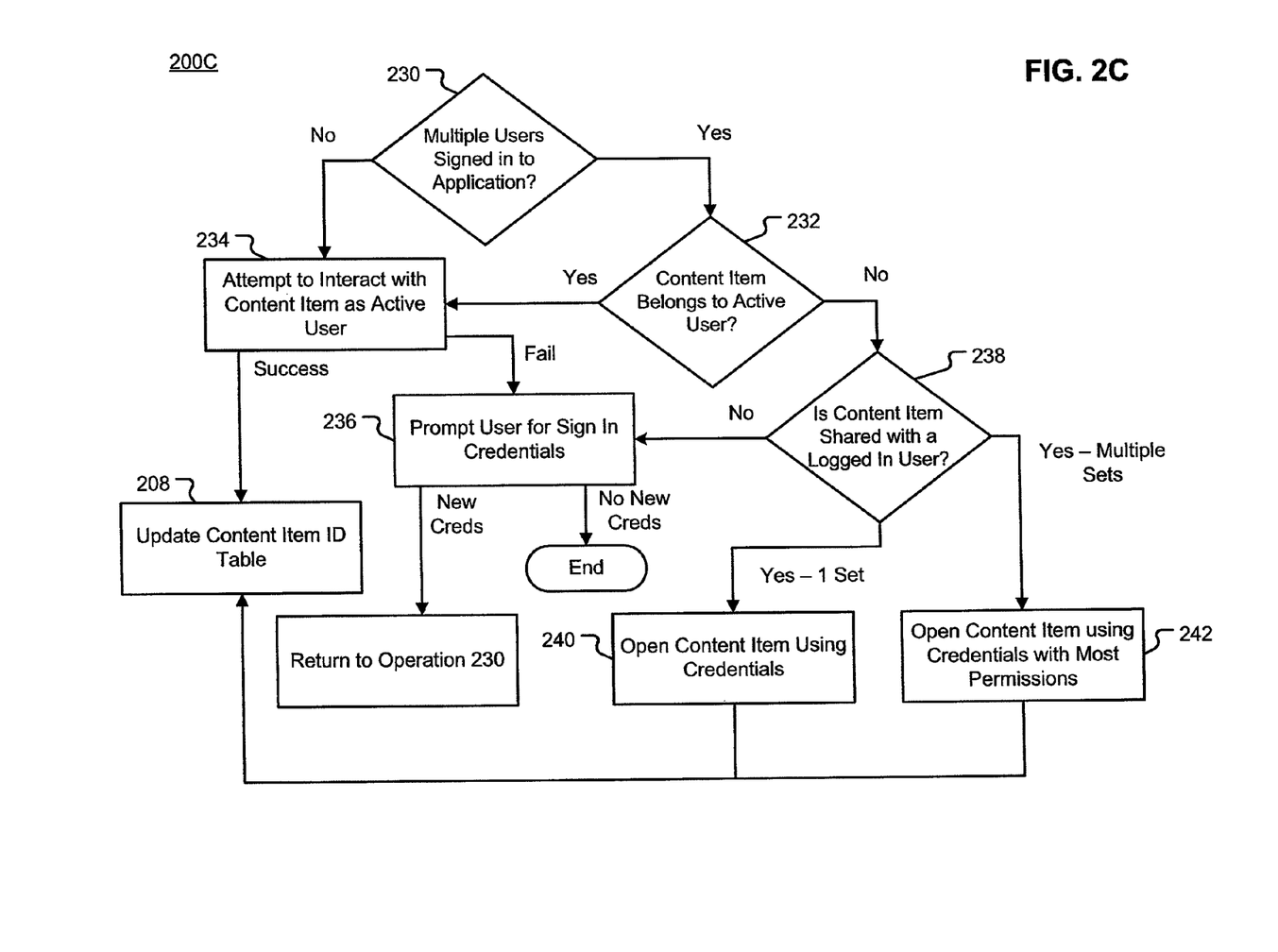

FIGS. 2A, 2B, and 2C illustrates sub-methods 200A, 200B, and 200C that may be used, either separately or in combination, to determine access permissions for a content item among multiple users of a computing device. For example, a computing device, such as, for example computing device 120 (FIG. 1) may execute the method 200 to determine whether one or more users (e.g., first user 110, second user 112, or third user 114) may access a particular content item. Additionally, the computing device 120 is configured to store associations between each of the users and the content item.

Method 200A (FIG. 2A) begins when a request is received 202 (e.g., by the computing device) to open a content item, such as, for example a document. The content item may be stored in one or more cloud storage services that are associated with a particular user. For example, a computing device being utilized by the particular user may have a cloud storage service client (e.g., SKYDRIVE client) that is being executed on the computing device. When the particular user desires to save a content item to her SKYDRIVE account, the content item is placed (e.g., saved, dragged and dropped, etc.) into a folder or other such location on the computing device. The cloud storage service then synchronizes with the local client and all content items that were placed into the folder are saved on the associated cloud storage service. In another embodiment, the content item may be stored on another external storage structure.

In response to the request to open the content item, a determination is made 204 as to whether the content item is being opened from the cloud storage service's local client location (e.g., the folder or location associated with the cloud storage service). In certain embodiments, a user may attempt to open a content item that is located within the local client location only when the user is currently logged in to her cloud storage service account (e.g., her SKYDIRVE account). If the determination is made that the content item is being interacted with (e.g., opened) from the local client location, flow proceeds to operation 206 in which the content item is interacted with using the user's user credentials that are associated with the particular cloud storage service.

When the user has been enabled to interact with the content item, flow proceeds to operation 208 in which the content item ID table (e.g., content item ID table 140 (FIG. 1)) is updated. As will be explained in greater detail below, updating the content item ID table includes associating the content item with the credentials or other identifiers of the user that interacted with the content item. As discussed above, the credentials may be a WINDOWS LIVE ID, an OFFICE 365 ID, an email address and associated password, a username and password, an organization ID and the like.

Referring back to FIG. 2A, if it is determined in operation 204 that the content item is not being opened from the local client location of the cloud storage service, either because e.g., (i) a local client application has not been installed on the computing device to enable communication with the cloud storage service, (ii) the current user is not logged in to the cloud storage service or does not have access to the local client, or (iii) the content item to be interacted with is not located in the local client location, flow proceeds to operation 210 in which a determination is made as to whether an application that is being used to interact with the content item (e.g., word processing application, spreadsheet application, etc.) has previously had access to the content item. In certain embodiments, the determination of operation 210 is based on the information contained in the content item ID table.

As discussed above, each content item is associated with a URL. In certain embodiments, the URL of the content item describes a location at which the content item is being stored. In an embodiment, the URL of the content item is stored within the content item itself The content item ID table stores an association between the content item identified by the URL and an identity object (e.g., an object that describes which user previously accessed the document and the user credentials of the user). In certain embodiments, each user has an associated identity object that is unique to the user. Thus, in operation 210, if an identity object is associated the URL of the content item in the content item ID table, it is determined that the selected content item has previously been interacted with. As a result, flow proceeds to operation 212.

In operation 212, a determination is made as to whether the credentials stored in the identity object match the credentials of the active profile of the application that is attempting to interact with the content item. In certain embodiments, the active profile is associated with the user that is currently and actively logged in to the application (or operating system) (e.g., the user that is actively using the computing device or application). As discussed above, multiple users may be concurrently logged in to the computing device. As such, the active profile is associated with one of the multiple users who is actively utilizing one or more functions of the computing device (e.g., interacting with the computing device). In an embodiment, the application that is attempting to interact with the content item is configured to display the active profile on a user interface. Exemplary embodiments of the user interface are shown with respect to FIGS. 3A and 3B.

Figure 3A:
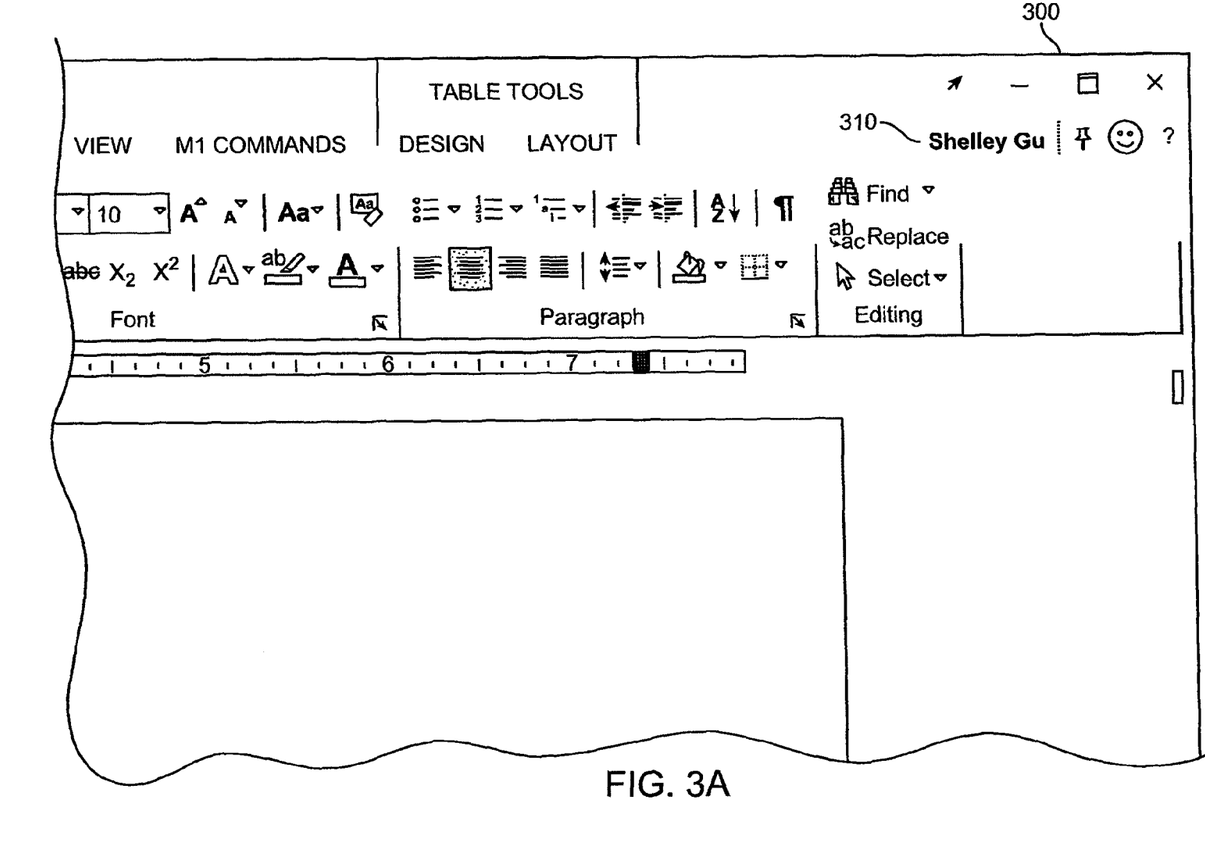
FIGS. 3A and 3B illustrate an exemplary user interface that may be used with according to one or more embodiments disclosed herein.

Referring to FIG. 3A, FIG. 3A illustrates an exemplary user interface 300 that displays an identifier 310 associated with the user of the active profile. As shown in FIG. 3A, the identifier may include the name of the user that is currently identified as the active profile user. In another embodiment, the identifier may be an icon, avatar, username, email address, or any combination thereof. In certain embodiments, different users may be selected as the active profile user in response to a user selecting the identifier 310. Such an embodiment is shown with respect to FIG. 3B.

Figure 3B:
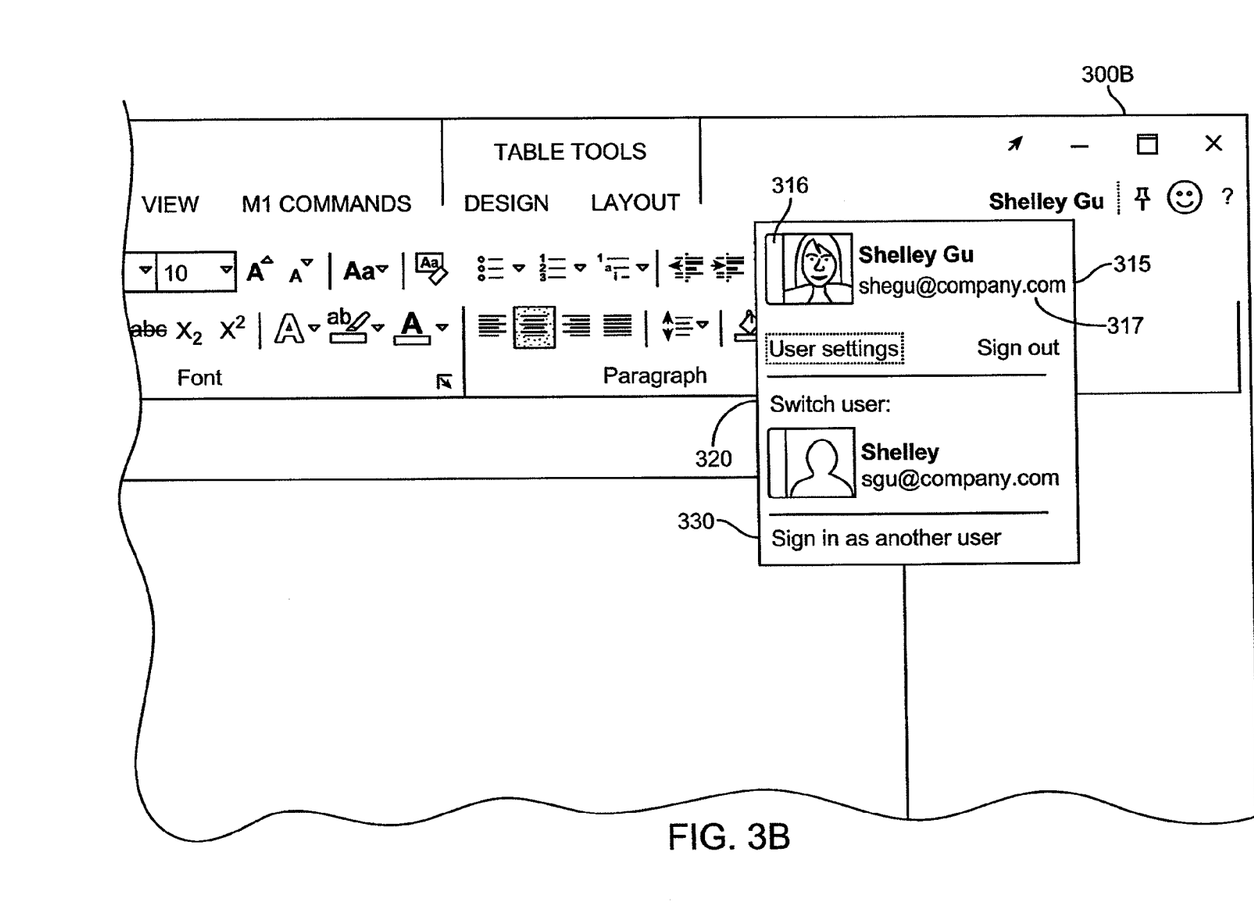

FIG. 3B illustrates an exemplary user interface 300B that is displayed in response to user selection of the identifier 310 (FIG. 3A) when attempting to change the active profile user. In certain embodiments, in response to user selection of the identifier 310, a user badge 315 is output on the user interface 300B. The user badge 315 may include additional information about the active profile user. For example, user badge 315 may identify the name of the active profile user (e.g., "Shelley Gu"). The user badge 315 may also provide additional identifiers associated with the active profile user, such as, for example, an image 316 of the user and an email address 317 of the user. Although an image and email address are specifically mentioned, it is contemplated that fewer or additional identifiers may be displayed in the user badge 315.

In certain embodiments, the user badge 315 may also enable the active profile user to adjust her user's settings. Such settings may include altering the image 316, the email address 317, or the identifier 310 (FIG. 1) of the active profile user. In another embodiment, the user settings may be used to adjust credentials and/or permissions associated with the active profile user.

As shown in FIG. 3B, the user badge 315 may also display one or more users 320 who are currently logged in to the operating system or the application but who are not the active profile user. For example, the user badge 315 may be configured to display one or more identifiers associated with the one or more users 320 such as, for example, a name of at least one user who is currently logged in, an image associated with the at least one user, an email address of the at least one user, etc. Because the at least one user 320 has already provided her user credentials, selection of the at least one user 320 causes the at least one user to become the active profile user. For example, upon selection of the at least one user (e.g., Shelley) the active profile user is changed from "Shelley Gu" to "Shelley." As the active profile switches between the various users, one more settings or preferences (e.g., application settings, operating system settings etc.) associated with each user are also updated accordingly.

If however, a user has not provided log in credentials and wishes to become the active profile user, the user may select a sign in option 330, that enables the user to submit her credentials and become the active profile user. Once the user has provided her credentials and has been verified, the user will become the active profile user. Although the active profile user has been updated, each of the other users (e.g., Shelley Gu and Shelley) remain logged in. As discussed, each logged in user may become the active profile user when selection of that user is made on the user badge 315.

Referring back to FIG. 2, if it is determined in operation 212 that one or more of the credentials stored in the identity object match the credentials of the active profile, flow proceeds to operation 214 in which the content item is interacted with using the credentials stored in the content item ID table (e.g., the credentials that were stored in the identity object). Once the content item has been interacted with (e.g., opened), flow proceeds to operation 208 in which the content item ID table is updated.

If however, it is determined in operation 212 that the active user's credentials do not match any of the credentials stored in the identity object, flow proceeds to operation 216 in which the application attempts to interact with the content item using the credentials that are associated with the active profile user (e.g., the credentials of the user who is identified by the identifier 310 (FIG. 3A)). If the credentials associated with the active profile user are sufficient to allow the user to interact with the content item (e.g., the user has read, read/write permissions etc.), the active profile user may interact with the content item and the association between the active profile user and the content item is stored 208 in the content item ID table.

However, if the credentials associated with the active profile user are not sufficient to allow the active profile user to interact with the content item, flow proceeds back to operation 214 in which the application attempts to interact with the content item using the user credentials that are stored in the content item ID table (e.g., the credentials stored in the identity object). In certain embodiments, these user credentials may only be used when the user that is associated with the credentials that are stored in the identity object is currently logged in to (i) the operating system, or (ii) the application.

Once the user has interacted with (e.g., opened) the content item, flow proceeds to operation 208 in which the content item ID table is updated. In such a scenario, the content item ID table is updated to reflect the association between the active profile user (e.g., the user who did not have the credentials stored in the identity object) and the content item. In another embodiment, the content item ID table is updated to reflect the association between the user whose credentials were used to interact with the content item, and the content item itself.

Referring back to operation 210, if it is determined in operation 210 that the application that is being used to interact with the content item has not previously had access to the content item (e.g., there is no association between the URL of the content item and an identity object), flow proceeds to operation 218 in which the application attempts to interact with the content item using the credentials associated with the active profile user. If the active profile user has sufficient permissions to interact with the content item, flow proceeds to operation 208 in which the content item ID table is updated to reflect the association between the active profile user and the content item. If however, the active profile user does not have sufficient permissions to interact with the content item, flow proceeds to operation 220 of sub-method 200B (FIG. 2B).

In operation 220 a determination is made as to the cloud storage service with which the content item was associated. For example, the user may have access to two different cloud storage services. For example, the user may have a SKYDRIVE account and a SHAREPOINT account with a profile associated with each account. However, as will be described below, although the user has multiple profiles, one of the profiles is considered as an active user profile. Although specific examples have been given, it is contemplated that a user may have access to various cloud storages services and a user may have one or more profiles for each of the cloud storage services.

In certain embodiments, the determination as to which cloud storage service is associated with the content item, is based on a URL or domain of the content item. For example, the content item may have a URL of "www.company.com/Shelley's Documents/document1.docx." If it is determined, based on the URL or domain associated with the content item, that the content item is associated with a first cloud storage services (e.g., SHAREPOINT), or more specifically, an entity that is utilizing the cloud storage service (e.g., the "company" in the domain address), flow proceeds to operation 222 in which it is determined whether the active profile user is associated with the entity (e.g., the "company"). For example, a determination is made as to whether the active profile user has an identifier (e.g., email address, such as, for example, shelley@company.com) that enables the active profile user to access documents from the company's cloud storage service. In another embodiment, the active profile user need not have the associated domain (e.g., @company.com) in order to interact with the document. In such cases, the active profile user may access the content item as long as at least one logged in user of the computing device is associated with appropriate domain. For example, if Shelley is not the active profile user but is currently logged in, the active profile user may be able to interact with the content item using, for example, Shelley's credentials.

If it is determined in operation 222 that the active profile user has not logged in with a matching identifier (e.g., @company.com), flow proceeds to operation 228 in which the active profile user is prompted for credentials that would enable the active profile user to interact with the content item. If however, it is determined in operation 222 that the active profile user has logged in using a matching identifier, flow proceeds to operation 224 in which the application attempts to interact with content item using the credentials associated with the active user profile. If the active profile user has appropriate credentials, the content item is opened 226 and the association between the active profile user and the content item is updated 208 in the content item ID table. However, if the active profile user does not have permissions to interact with the content item, flow proceeds operation 228 and the active profile user is prompted for appropriate credentials.

Referring back to operation 220, if it is determined in operation 220 that that a second cloud storage service is used (e.g., SKYDRIVE) to store the content item flow proceeds to operation 230 of sub-method 200C FIG. 2C. As discussed above, this determination may be made based on a URL associated with the content item, a domain of the content item or an identifier association with the content item. For example, if the second cloud storage service is SKYDRIVE, the identifier may be a WINDOWS LIVE ID.

In operation 230, a determination is made as to whether multiple users are currently signed in to the cloud storage service (e.g., SKYDRIVE) on a single computing device. For example, the computing device may be shared between three users and each user may have an identifier (e.g., WINDOWS LIVE ID) associated with the cloud storage service.

If it is determined in operation 230 that only one user (e.g., active user) is currently signed in to the application (or the cloud storage service via the application), flow proceeds to operation 234 in which an attempt is made to interact with the content item as the active user. If the active user has sufficient permissions (e.g., based on the credentials associated with the active user) to interact with the content item, flow proceeds to operation 208 in which the association between the active user and the content item is updated. If however, the active user does not have sufficient permissions to interact with the content item, the user interface of the application prompts 236 the active user for different sign in credentials. In certain embodiments, if the active user provides additional sign in credentials, the flow may return to operation 220 and the sub-method 200B repeats with the new sign in credentials. If the active user does not enter in additional sign in credentials, the method ends and the user is denied access to the content item.

Referring back to operation 230, if it is determined that multiple users are currently signed in to the application (or the cloud storage service via the application), flow proceeds to operation 232 in which it is determined whether the content item belongs to the active user (e.g., originates from, or is stored in the active user's cloud storage service). If the active user is not the owner of the content item, flow proceeds to operation 238 which will be discussed below. However, if the active user is the owner of the content item, flow proceeds operation 234 and an attempt is made to interact with the content item such as was described above.

Referring back to operation 232, if it is determined that the owner of the content item is not logged in to the computing device in any capacity, flow proceeds to operation 238 in which it is determined whether the content item has been shared with any other user that is currently logged in to the operating system, application, and/or cloud storage service. In an embodiment, this determination is made based on data stored in the content item. For example, if the content item has been shared between users, the content item ID table may store data that indicates (i) that the content item has been shared and (ii) who the content item has been shared with. In another embodiment, this data may be stored with the content item.

If the determination is made is operation 238 that the content item has not been shared with any other user, flow proceeds to operation 236 in which the active profile user is prompted for credentials that enable the user to interact with the content item. In an embodiment, if the active profile user submits additional user credentials, flow returns to operation 230 of sub-method 200C. The process then repeats with the additional user credentials. If however, the active profile user does not submit additional user credentials, the method ends and the user is denied access to the content item.

If however, it is determined in operation 238 that the content item has been shared with a single user, flow proceeds to operation 240 in which the content item is interacted with using the credentials associated with the user to which the content item was shared. For example, if a first user shared a document with a second user, and the second user was currently logged in to the cloud storage service, a third user may be able to interact with the content item, using the credentials of the second user. Once the document has been interacted with, flow proceeds to operation 208 in which the content item ID table is updated with the association between the content item and the credentials of the user that was used to interact with the content item (e.g., the second user).

Referring back to operation 238, if it is determined that the content item has been shared with multiple users, flow proceeds to operation 242 in which the content item is interacted with using the credentials of the user having the most permissions. For example, if a first user shared a document with a second user and a third user, and the second user only had read permissions and the third user had read/write permissions, the content item would be interacted with using the credentials of the third user. Once the content item has been interacted with, flow proceeds to operation 208 in which the content item ID table is updated with the association between the content item and the credentials of the user that was used to interact with the content item (e.g., the third user).

In certain embodiments, the content item ID table, and the associations between the various content items and the users is maintained as long as at least one user remains logged in to the application (e.g., word processing application etc.). Once all users have logged out of the application, the associations stored in the content item ID table are reset. In another embodiment, each application has an associated content item ID table. In an alternative embodiment, two or more applications may share a single content item ID table.

Figure 4:
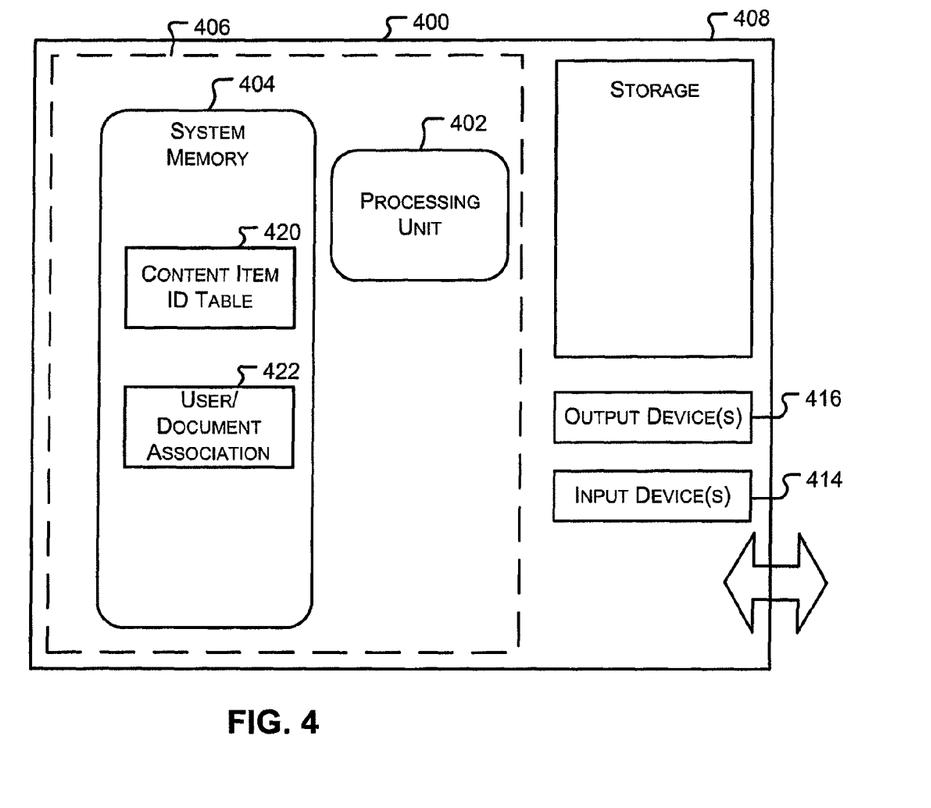
FIG. 4 illustrates a block diagram of a computing environment suitable for implementing embodiments disclosed herein.

FIG. 4 illustrates a general computer system 400, which can be used to implement the embodiments described herein. The computer system 400 is only one example of a computing environment and is not intended to suggest any limitation as to the scope of use or functionality of the computer and network architectures. Neither should the computer system 400 be interpreted as having any dependency or requirement relating to any one or combination of components illustrated in the example computer system 400. In embodiments, system 400 may be used as the computing device 120 described above with respect to FIG. 1.

In its most basic configuration, system 400 typically includes at least one processing unit 402 and memory 404. Depending on the exact configuration and type of computing device, memory 404 may be volatile (such as RAM), non-volatile (such as ROM, flash memory, etc.) or some combination. This most basic configuration is illustrated in FIG. 4 by dashed line 406. System memory 404 stores instructions 420, such as the instructions to associate a user with a content item that the user has interacted with, and data 422 such as the associations of the content item ID table, each of which may be stored in a file storage system such as storage 408.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage, and non-removable storage 408 are all computer storage media examples (e.g. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 414 such as a keyboard, a mouse, a pen, a sound input device, a touch input device, etc. Output device(s) 416 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments disclosed may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing continuous access to a resource may operate via application-specific logic integrated with other components of the computing device/system 400 on the single integrated circuit (chip).

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

I claim:

1. A method for accessing a content item using a shared computing device, the method comprising:
   receiving a request to interact with a content item in a requested manner;
   determining whether the content item is associated with a particular cloud computing service of a plurality of cloud computing services;
   determining, based at least in part on an identification table associated with the content item, whether an association exists between the content item and a first user of a plurality of users of the computing device;
   when it is determined that the association exists between the content item and the first user:
      determining whether credentials of an active profile of a second user of the computing device match credentials stored in an identity object associated with the first user; and
      when the credentials of the active profile of the second user match the credentials stored in the identity object associated with the first user, enabling interaction between the active profile of the second user and the content item in the requested manner using credentials associated with the first user;
      otherwise, attempting to enable interaction between the active profile of the second user and the content item in the requested manner using credentials associated with the active profile of the second user; and
      when the attempt to enable interaction between the active profile of the second user and the content item is unsuccessful, attempting to enable interaction between the active profile of the second user and the content item using credentials associated with a third user, wherein the credentials of the third user are different than the credentials associated with the active profile of the second user.

2. The method of claim 1, further comprising updating an association between the first user and the content item in the identification table when the active profile of the second user match the credentials stored in the identity object associated with the first user.

3. The method of claim 1, further comprising maintaining an association between the active profile of the second user and the content item in the identification table when the attempt to enable interaction between the active profile of the second user and the content item is successful.

4. The method of claim 1, further comprising updating an association between the first user and the content item in the identification table when the attempt to enable interaction between the active profile of the second user and the content item, using credentials associated with the first user, is successful.

5. The method of claim 1, further comprising maintaining the identification table when at least one user of the plurality of users is logged in to the computing device.

6. The method of claim 1, wherein the identification table includes a uniform resource locator of the content item.

7. The method of claim 6, wherein the uniform resource locator is associated with one or more identifiers of at least one user of the plurality of users.

8. The method of claim 1, further comprising attempting to enable interaction between the active profile of the second user and the content item in the requested manner when it is determined that an association does not exist between the content item and at least one user of the plurality of users, wherein attempting to enable interaction between the active profile of the second user and the content item in the requested manner when it is determined that an association does not exist includes attempting to enable interaction between the active profile of the second user and the content item using credentials associated with the active profile of the second user.

9. The method of claim 8, further comprising updating the identification table when the attempt to enable interaction between the active profile of the second user and the content item is successful.

10. The method of claim 8, wherein the determining is based, at least in part, on a uniform resource locator associated with the content item.

11. A computer-readable storage device encoding computer executable instructions that, when executed by at least one processor, performs a method for accessing a content item using a shared computing device, the method comprising:
    receiving a request to interact with a content item in a requested manner;
    determining whether the content item is associated with a particular cloud computing service of a plurality of cloud computing services;
    determining, based at least in part on an identification table associated with the content item, whether an association exists between the content item and at least a first user of a plurality of users of the computing device;
    when it is determined that the association exists between the content item and the first user:
       determining whether credentials of an active profile of a second user of the computing device match credentials stored in an identity object associated with the first user; and
       when the credentials of the active profile of the second user match the credentials stored in the identity object associated with the first user, enabling interaction between the active profile of the second user and the content item in the requested manner using credentials associated with the first user;
       otherwise, attempting to enable interaction between the active profile of the second user and the content item in the requested manner using credentials associated with the active profile of the second user; and when the attempt to enable interaction between the active profile of the second user and the content item is unsuccessful, attempting to enable interaction between the active profile of the second user and the content item using credentials associated with at least a third user, wherein the credentials of the third user are different than the credentials associated with the active profile of the second user.

12. The computer-readable storage device of claim 11, further comprising updating an association between the first user and the content item in the identification table when the credentials of the active profile of the second user match the credentials stored in the identity object associated with the first user.

13. The computer-readable storage device of claim 12, further comprising maintaining an association between the active profile of the second user and the content item in the identification table when the attempt to enable interaction between the active profile of the second user and the content item is successful.

14. The computer-readable storage device of claim 13, further comprising updating an association between the first user and the content item in the identification table when the attempt to enable interaction between the active profile of the second user and the content item, using credentials associated with the first user, is successful.

15. The computer-readable storage device of claim 14, further comprising maintaining the identification table when at least one user of the plurality of users is logged in to the computing device.

16. The computer-readable storage device of claim 15, wherein the identification table includes a uniform resource locator of the content item.

17. The computer-readable storage device of claim 16, wherein the uniform resource locator is associated with one or more identifiers of at least one user of the plurality of users.

18. The computer-readable storage device of claim 16, further comprising attempting to enable interaction between the active profile of the second user and the content item in the requested manner when it is determined that an association does not exist between the content item and at least one user of the plurality of users, wherein attempting to enable interaction between the active profile of the second user and the content item in the requested manner when it is determined that an association does not exist includes attempting to enable interaction between the active profile of the second user and the content item using credentials associated with the active profile of the second user.

19. A computer system for accessing a content item, the system comprising:

one or more processors; and a memory coupled to the one or more processors, the memory for storing instructions which, when executed by the one or more processors, cause the one or more processors to perform a method, the method comprising:

receiving a request to interact with a content item in a requested manner;

determining whether the content item is associated with a particular cloud computing service of a plurality of cloud computing services;

determining, based at least in part on an identification table associated with the content item, whether an association exists between the content item and a first user of a plurality of users of the computer system;

when it is determined that the association exists between the content item and the first user:

determining, based on user credentials associated with (i) an active profile of a second user of the computer system, and (ii) the first user, whether credentials of the active profile of the second user of the computer system match credentials stored in an identity object associated with the first user;

when the credentials of the active profile of the second user match the credentials stored in the identity object associated with the first user, enabling interaction between the active profile of the second user and the content item in the requested manner using credentials associated with the first user;

otherwise, attempting to enable interaction between the active profile of the second user and the content item in the requested manner using credentials associated with the active profile of the second user; and when the attempt to enable interaction between the active profile of the second user and the content item is unsuccessful, attempting to enable interaction between the active profile of the second user and the content item using credentials associated with a third user, herein the credentials of the third user are different than the credentials associated with the active profile of the second user; and in response to enabling interaction between the active profile of the second user and the content item, updating the identification table based on the enabled interaction.

* * * * *